(12) United States Patent
Santori et al.

(10) Patent No.: US 7,533,347 B2
(45) Date of Patent: May 12, 2009

(54) CREATING A GRAPHICAL USER INTERFACE FOR SELECTED PARAMETERS OF A GRAPHICAL PROGRAM

(75) Inventors: Michael L. Santori, Austin, TX (US); John C. Limroth, Austin, TX (US); Gregory O. Morrow, Austin, TX (US)

(73) Assignee: National Instruments Corporation, Austin, TX (US)

(*) Notice: Subject to any disclaimer, the term of this patent is extended or adjusted under 35 U.S.C. 154(b) by 480 days.

(21) Appl. No.: 10/918,215

(22) Filed: Aug. 13, 2004

(65) Prior Publication Data

US 2005/0066285 A1 Mar. 24, 2005

Related U.S. Application Data

(60) Provisional application No. 60/494,755, filed on Aug. 13, 2003.

(51) Int. Cl.
*G06F 3/00* (2006.01)
*G06F 3/14* (2006.01)
*G06F 9/44* (2006.01)

(52) U.S. Cl. ............... 715/763; 715/762; 715/765; 715/810; 715/853; 717/113; 717/114

(58) Field of Classification Search .......... 715/700, 715/762, 763, 764, 765, 771, 810, 853, 967; 717/100, 113, 114
See application file for complete search history.

(56) References Cited

U.S. PATENT DOCUMENTS

| | | | |
|---|---|---|---|
| 5,163,130 A | | 11/1992 | Hullot |
| 5,377,318 A | * | 12/1994 | Wolber ............... 715/809 |
| 5,481,741 A | | 1/1996 | McKaskle et al. |
| 5,506,952 A | * | 4/1996 | Choy et al. ............ 715/763 |
| 5,774,725 A | * | 6/1998 | Yadav et al. .......... 717/135 |
| 5,826,086 A | * | 10/1998 | Arima et al. .......... 717/105 |
| 5,903,455 A | * | 5/1999 | Sharpe et al. .......... 700/83 |

(Continued)

OTHER PUBLICATIONS

International search report application No. PCT/US2004/026224 mailed Dec. 30, 2005.

(Continued)

*Primary Examiner*—X. L Bautista
(74) *Attorney, Agent, or Firm*—Meyertons Hood Kivlin Kowert & Goetzel, P.C.; Jeffrey C. Hood; Mark S. Williams

(57) ABSTRACT

System and method for providing a graphical user interface (GUI) for selected parameters of a graphical program, e.g., a model. The program is analyzed to determine a plurality of parameters, which are displayed, e.g., in a list, tree diagram, palette, etc. User input is received selecting one or more of the plurality of parameters. A GUI for the one or more parameters is generated, comprising one or more GUI elements, e.g., controls and/or indicators, corresponding respectively to the one or more parameters, e.g., the one or more parameters are analyzed with respect to data type, and the one or more GUI elements determined based on the analysis, e.g., by user selection from a plurality of GUI elements presented in response to the analysis, added to the GUI and associated with the one or more parameters. During execution of the graphical program, the one or more GUI elements access corresponding parameters.

41 Claims, 10 Drawing Sheets

U.S. PATENT DOCUMENTS

| | | | |
|---|---|---|---|
| 5,980,096 A * | 11/1999 | Thalhammer-Reyero | 707/100 |
| 6,113,649 A * | 9/2000 | Govindaraj | 717/113 |
| 6,225,998 B1 * | 5/2001 | Okita et al. | 715/853 |
| 6,263,339 B1 * | 7/2001 | Hirsch | 707/102 |
| 6,671,691 B1 * | 12/2003 | Bigus | 707/102 |
| 7,185,286 B2 * | 2/2007 | Zondervan et al. | 715/762 |
| 7,242,991 B2 * | 7/2007 | Budinger et al. | 700/95 |
| 2002/0059293 A1 * | 5/2002 | Hirsch | 707/103 R |
| 2002/0070965 A1 | 6/2002 | Austin | |
| 2002/0089541 A1 * | 7/2002 | Orbanes et al. | 345/764 |
| 2003/0037322 A1 | 2/2003 | Kodosky et al. | |
| 2003/0058280 A1 * | 3/2003 | Molinari et al. | 345/771 |
| 2003/0107595 A1 * | 6/2003 | Ciolfi | 345/762 |
| 2003/0132965 A1 | 7/2003 | Santori et al. | |
| 2004/0233237 A1 * | 11/2004 | Randow | 345/763 |
| 2004/0255269 A1 | 12/2004 | Santori et al. | |
| 2005/0283758 A1 * | 12/2005 | Cobcroft et al. | 717/113 |
| 2006/0129933 A1 * | 6/2006 | Land et al. | 715/723 |

OTHER PUBLICATIONS

Written Opinion of the International Searching Authority, mailed Dec. 30, 2005.

"Simulink—Model-Based and System-Based Design," Using Simulink, Version 5, The Math Works, Sep. 2003.

* cited by examiner

CREATING A GRAPHICAL USER INTERFACE FOR SELECTED PARAMETERS OF A GRAPHICAL PROGRAM

PRIORITY DATA

This application claims benefit of priority of U.S. provisional application Ser. No. 60/494,755 titled "Automatically Creating a Graphical User Interface for Selected Parameters of a Graphical Program" filed Aug. 13, 2003, whose inventors were Michael L. Santori, John C. Limroth, and Gregory O. Morrow.

FIELD OF THE INVENTION

The present invention relates to the field of graphical programming, and more particularly to a system and method for creating a graphical user interface for selected parameters of a graphical program, e.g., a block diagram or model, wherein the GUI can provide data to and/or receive data from the graphical program to modify and/or display the selected parameters.

DESCRIPTION OF THE RELATED ART

Traditionally, high level text-based programming languages have been used by programmers in writing application programs. Many different high level text-based programming languages exist, including BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, C++, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

In many applications, parameters of a graphical program may be associated with a graphical user interface (GUI) element whereby the parameters may be accessed, i.e., read or written. For example, graphical user interfaces (GUIs) enable users to interact with computer programs in an intuitive manner, utilizing various types of GUI elements. Different graphical programming environments may enable developers to include any of various types of GUI elements in a graphical program's graphical user interface or front panel. GUI elements may be configured to indicate data to the user, e.g., by displaying the data on a display screen. GUI elements may also be configured to provide user input to a graphical program. For example, GUI elements that may be used in instrumentation or measurement applications may include a knob GUI element for adjusting a parameter, e.g., the frequency and/or amplitude of a simulated signal, a chart GUI element for displaying a chart, e.g., of a power spectrum, a thermometer, an LED, a meter, a waveform chart, a tank, etc. Other types of GUI elements that may be included in a graphical user interface or front panel include text boxes, check boxes, etc. For example, when the value of a frequency knob on a user interface panel changes, e.g., due to a user interactively turning the knob, the graphical program may detect this change in value, e.g., by intercepting an event triggered when the value changes, and may respond by changing the signal that is generated in accordance with the new frequency value.

Typically, to configure a GUI for access to parameters of the graphical program, the user must manually determine all of the relevant parameters of the program, create or select an appropriate GUI element for each parameter, associate the GUI element to the parameter, and include the GUI element in the graphical program. In complex graphical programs, such as detailed models of systems and processes, there may be a great number of parameters used at various levels of operation or functionality of the graphical program, and so the manual determination of parameters and development of the GUI may be tedious, labor intensive, and error prone.

Thus, improved systems and methods for creating a GUI for accessing parameters of a graphical program are desired.

SUMMARY OF THE INVENTION

Various embodiments of a system and method for providing a graphical user interface (GUI) for accessing selected parameters of a graphical program are presented.

A graphical program may optionally be created on a host computer system (or on a different computer system). The graphical program may be created in various manners, either by the user or programmatically, as desired, and may implement any of a variety of functions, e.g., a measurement function, which the user desires to be performed, e.g., by an instrument. For example, in an application where the instrument is an image acquisition device (e.g., smart camera), the graphical program may implement an image processing function. In on embodiment, the graphical program may comprise a model, e.g., of a system of process.

The graphical program may be programmatically analyzed to determine a plurality of parameters referenced or used by the graphical program, and the plurality of parameters displayed, e.g., on a display device, such as a computer monitor. The plurality of parameters may be parameters of various nodes in the graphical program.

In various embodiments, the plurality of parameters may be displayed in a number of ways. For example, in one embodiment, the plurality of parameters may be displayed in a list, e.g., in a menu. In another embodiment, the plurality of parameters may be displayed in a tree diagram. For example, displaying the plurality of parameters in a tree diagram may include displaying the plurality of parameters in a hierarchy, where the hierarchy represents a structure and/or operation of the graphical program. In other words, various of the parameters may correspond to respective portions or functionalities of the graphical program, and may be presented in a manner that corresponds to or reflects a hierarchical relationship between these portions or functionalities.

User input selecting one or more parameters of the plurality of parameters may then be received. For example, in one embodiment, the user input may include the user indicating the one or more parameters, e.g., by clicking on or otherwise selecting the parameters with a pointing device, such as a computer mouse, although other means of selection are also contemplated. For example, in another embodiment, the user may enter names of the one or more parameters into a text entry field.

In one embodiment, the user may then select a GUI element to associate with or link to the respective parameter. For example, the user may browse among various GUI element palettes and select an appropriate GUI element for a parameter. Thus the user may select a first parameter, and then select a first GUI element to associate with the first parameter, and the user may then select a second parameter, and then select a second GUI element to associate with the second parameter, and so on.

In one embodiment, software may analyze the selected parameter and programmatically determine a subset of GUI elements from which the user may select an appropriate GUI element to link to the selected parameter. The subset of GUI elements may be determined based on the type of parameter, such as the data type of the parameter, whether the parameter is desired to be read from or written to, and possibly other criteria. The user may then select a GUI element from this determined subset of GUI elements.

In one embodiment, a GUI for the one or more selected parameters may be programmatically created, where the GUI includes one or more GUI elements corresponding respectively to the one or more parameters. In one embodiment, creating the GUI for the one or more parameters may include analyzing the one or more parameters, including analyzing the data types of the one or more parameters, and determining the one or more GUI elements based on the analysis. For example, consider a case where the one or more parameters include data types of integer, double, and character data types. The method may analyze these data types and determine corresponding GUI elements appropriate for accessing parameters of these data types. Thus, integer numeric controls and/or indicators may be determined for parameters of integer data type, character controls and/or indicators may be determined for parameters of character data type, and so forth.

The user may also indicate whether respective parameters are to be read from or written to, and this information may be used, possibly with other information, such as data type, in programmatically creating the GUI. The user input may indicate whether each of the one or more parameters is to be read, written, or both, i.e., indicating an "access" type or mode for the parameter. Thus, in this embodiment, the one or more GUI elements may at least in part be determined based on the received user input indicating whether each of the one or more parameters is to be read, written, or both. For example, if the user indicates that a particular parameter is to be displayed (i.e., read) during execution of the graphical program, the determined GUI element for that parameter may be an indicator; if the user indicates that the parameter is to be modified (i.e., written) during execution of the graphical program, the determined GUI element may be a control; and if the user indicates that the parameter is to be displayed and modified (i.e., read and written) during execution of the graphical program, the determined GUI element may be both an indicator and a control.

The user may thus select a plurality of parameters from the list or palette of programmatically determined parameters, and may indicate the access type (e.g., read or write) of each parameter. The software may then analyze the parameters, such as the data type of each of the parameters, and possibly other information, and programmatically generate a GUI comprising GUI elements for each of the selected plurality of parameters.

In one embodiment, at least one of the respective one or more GUI elements includes a control, where during execution of the graphical program the control is operable to receive input specifying a modification to the corresponding parameter, and modify the corresponding parameter in accordance with the input. In another embodiment, at least one of the respective one or more GUI elements includes an indicator, where during execution of the graphical program the indicator is operable read the corresponding parameter, and display the corresponding parameter on a display device. In yet other embodiment, at least one of the respective one or more GUI elements may be both an indicator and a control, and so may be operable to both modify and display the corresponding parameter. In a further embodiment, one or more of the GUI elements may be operable to display and/or modify more than one parameter.

In the programmatically generated GUI, one or more GUI elements may be programmatically associated with or linked to the one or more parameters, where during execution of the graphical program, each of the one or more GUI elements may be operable to access a corresponding parameter of the one or more parameters. For example, for a first parameter the user desires to monitor, a first GUI element indicator may be created and linked to display values of the first parameter. For a second parameter the user desires to interactively adjust, a second GUI element control may be created and linked to provide user supplied values to the second parameter.

Finally, the graphical program may be executed, where executing the graphical program includes the one or more GUI elements accessing the one or more parameters. In other words, during execution of the graphical program, the various GUI elements may execute to read and display their respective parameters, write and modify the parameters, or both.

In one embodiment, user creation of (or programmatic creation of) the GUI for the one or more parameters includes creating a plurality of GUIs, where each of the plurality of GUIs includes a respective subset of the one or more GUI elements, and where each of the plurality of GUIs corresponds to a respective portion or operation of the graphical program. During execution of the graphical program, each GUI may operate to access parameters associated with the respective subset of the one or more GUI elements. In other words, the plurality of GUIs may be partitioned or organized such that each GUI corresponds to a respective portion of the graphical program.

For example, in an embodiment where the graphical program is a model of a manufacturing process, there may be portions of the model corresponding to materials input, materials processing, quality testing, control, and so forth. Each of these portions of the model may have corresponding parameter sets, and each parameter set may have a corresponding GUI with respective GUI elements for each parameter in the set.

In one embodiment, during execution of the graphical program, each of the plurality of GUIs may be active during execution of the respective portion of the graphical program. For example, in the manufacturing process model example, as each portion of the model executes, the corresponding GUI may be activated, where constituent GUI elements of the GUI operate to access the corresponding parameters in that portion of the model. In one embodiment, when a portion of the graphical program is not executing, the corresponding GUI may be de-activated. In one embodiment, during execution of the graphical program, each of the plurality of GUIs may only be displayed during execution of the respective portion of the graphical program. In other embodiments, the active/inactive status of each GUI may be visually indicated by other means, e.g., by "graying" the GUI to indicate an "inactive state".

In one embodiment, the analysis of the parameters, the determination of the GUI (the GUI elements) for the parameters, and the association of the GUI elements with the parameters may each be performed on all of the one or more parameters in turn. In other words, the parameters may be processed at each step as a "batch". In another embodiment, the analysis of the parameters, the determination of the GUI (the GUI elements), and the association of the GUI elements with the parameters may be performed iteratively, where each parameter is analyzed and the GUI element for that parameter determined and associated in an iterative manner until all of the one or more parameters are processed.

Subsequent to the creation of the GUI, the user may wish to modify the GUI. Thus, in one embodiment, further user input may be received specifying a modification to the GUI, and the GUI modified in response to the further user input. In various embodiments, the specified modification may include: adding an additional parameter of the plurality of parameters, where the GUI is modified to include a corresponding additional GUI element; removing a parameter from the one or more parameters, where the GUI is modified by removing the corresponding GUI element for that parameter; replacing a GUI element for a parameter; and/or modifying a GUI element for a parameter, among others.

Once the GUI has been created and/or modified as described above, the graphical program may be executed, where executing the graphical program includes the one or more GUI elements accessing the one or more parameters. For example, if a GUI element for a particular parameter is an indicator, then during program execution the indicator may display the value of the parameter, e.g., via a meter, gauge, numeric display, etc., in a front panel. If the GUI element for the parameter is a control, then during program execution the control may receive a new value for the parameter, e.g., from another program element or from user input, and may operate to modify the parameter accordingly. As is well known in the art, in some embodiments, the GUI element may be both an indicator and a control, and so the parameter may be displayed and modified during program execution.

In one embodiment, the creation or selection of the GUI for the one or more parameters of the graphical program may be facilitated by a configuration tool, whereby the parameters and GUI elements may be displayed and user input received, as described above. In one embodiment, the configuration tool may be integrated into the graphical program development environment. For example, the GUI creation/selection functionalities described above may be invoked from a menu in the environment, by clicking on a program icon, etc. In another embodiment, the configuration tool may be invoked by the user, resulting in a GUI being displayed through which the user may interactively view and specify the parameters and GUI element associations.

Thus, various embodiments of the systems and methods described herein may provide for programmatic creation of a graphical user interface for accessing selected parameters of a graphical program.

BRIEF DESCRIPTION OF THE DRAWINGS

A better understanding of the present invention can be obtained when the following detailed description of the preferred embodiment is considered in conjunction with the following drawings, in which.

Figure 1A:
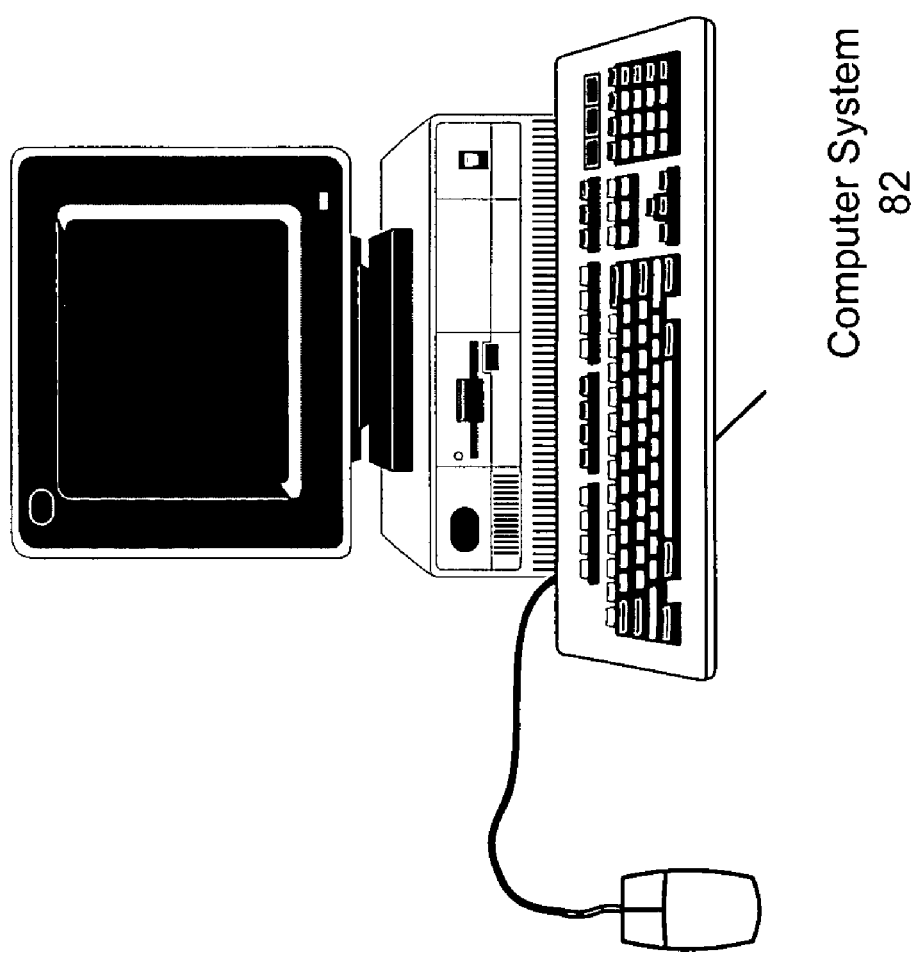
FIG. 1A illustrates a computer system operable to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, Vis Sim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, Vis Sim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1A—Computer System

FIG. 1A illustrates a computer system 82 operable to execute program instructions for providing a GUI for selected parameters of a graphical program.

As shown in FIG. 1A, the computer system 82 may include a display device operable to display the graphical program as the graphical program is created and/or executed. The display device may also be operable to display a graphical user interface or front panel of the graphical program during execution of the graphical program. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more graphical programs which are executable to perform the methods described herein. Also, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

Figure 1B:
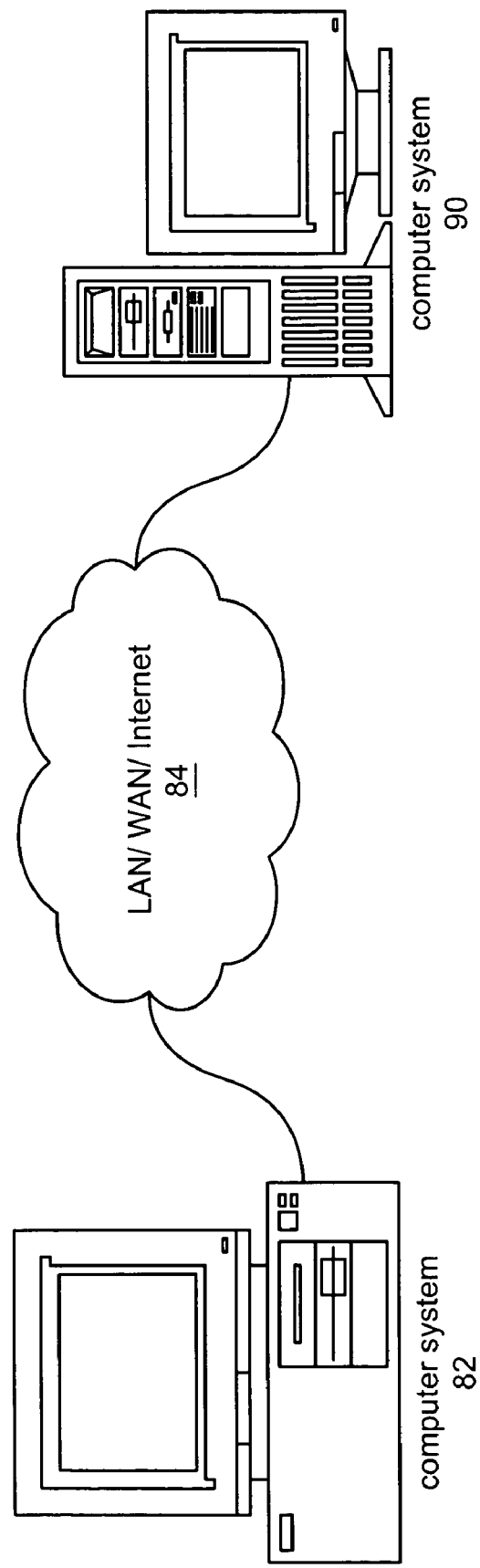
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device 190 connected to the computer system 82. The device 190 may include a programmable hardware element and/or may include a processor and memory medium which may execute a real time operating system. In one embodiment, the graphical program may be downloaded and executed on the device 190. For example, an application development environment with which the graphical program is associated may provide support for downloading a graphical program for execution on the device in a real time system.

Exemplary Systems

Embodiments of the present invention may be involved with performing test and/or measurement functions, e.g., data acquisition and/or signal generation; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
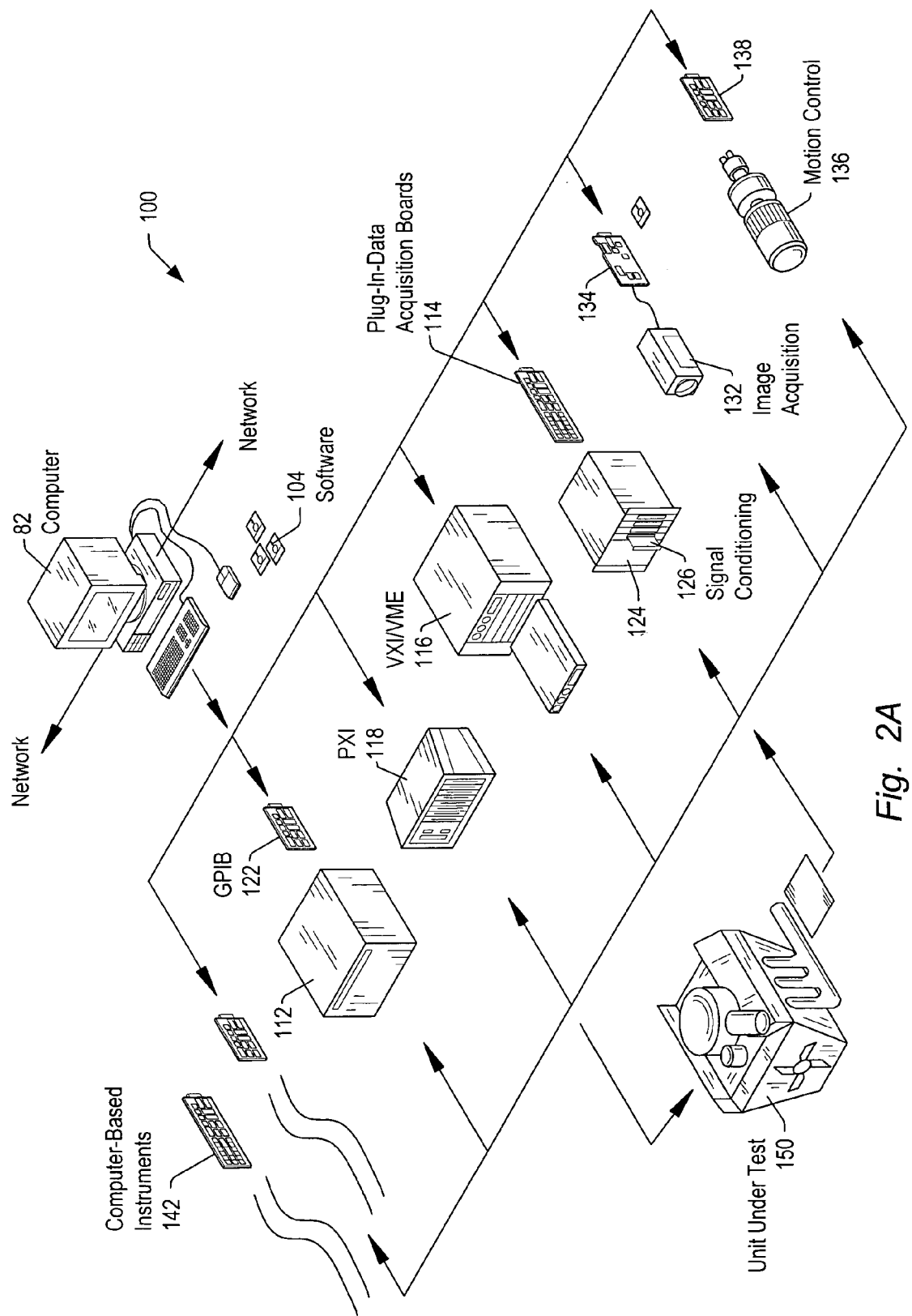
FIG. 2A illustrates an instrumentation control system according to one embodiment of the invention.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
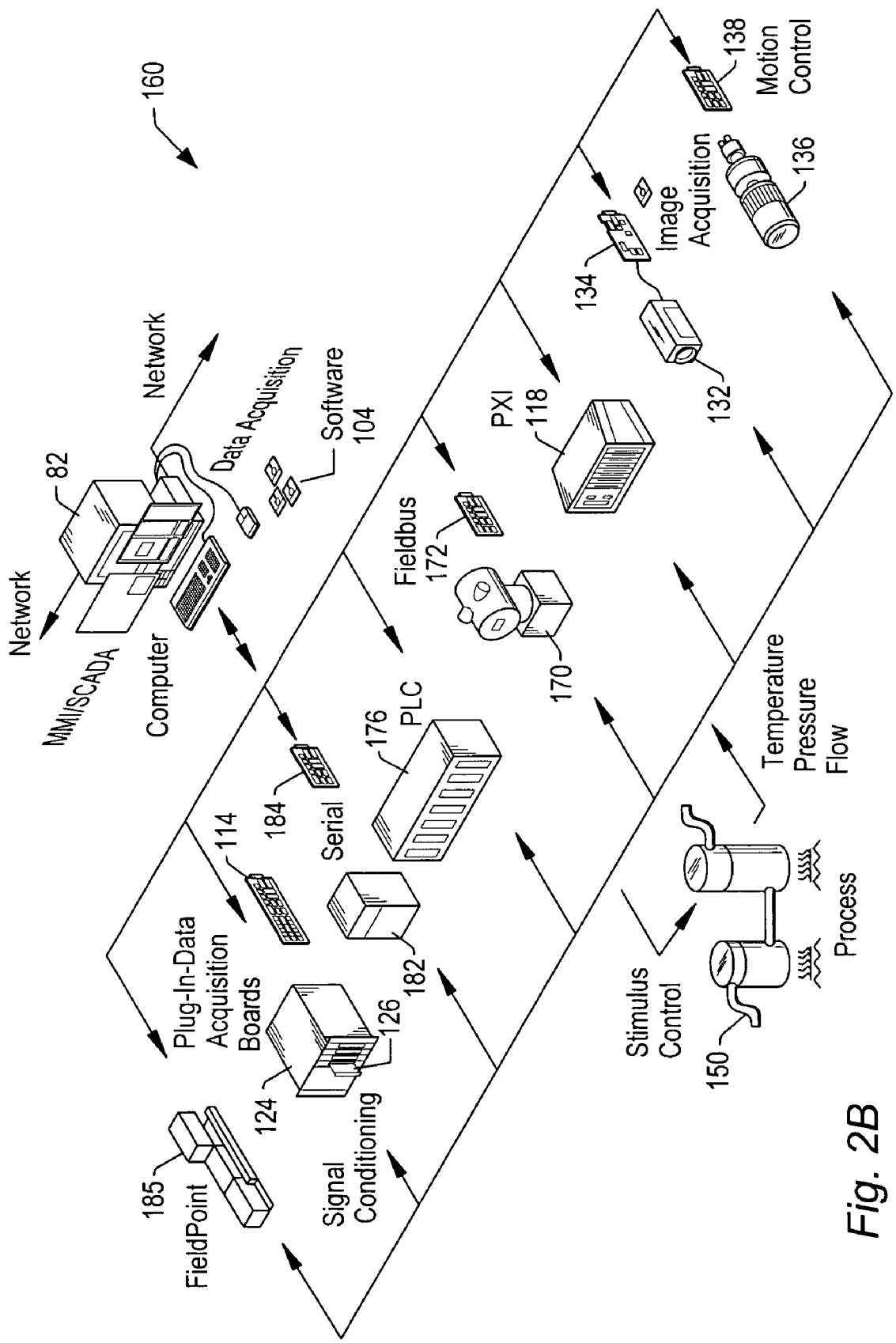
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
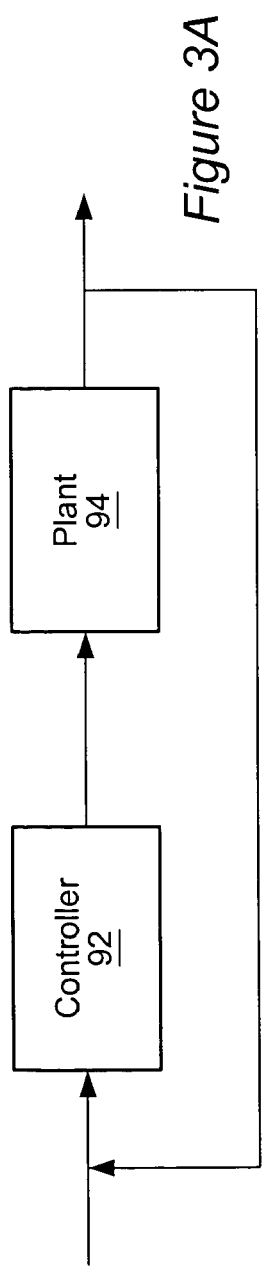
FIG. 3A is a high level block diagram of an exemplary system which may execute or utilize graphical programs.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an engine control unit (ECU) for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
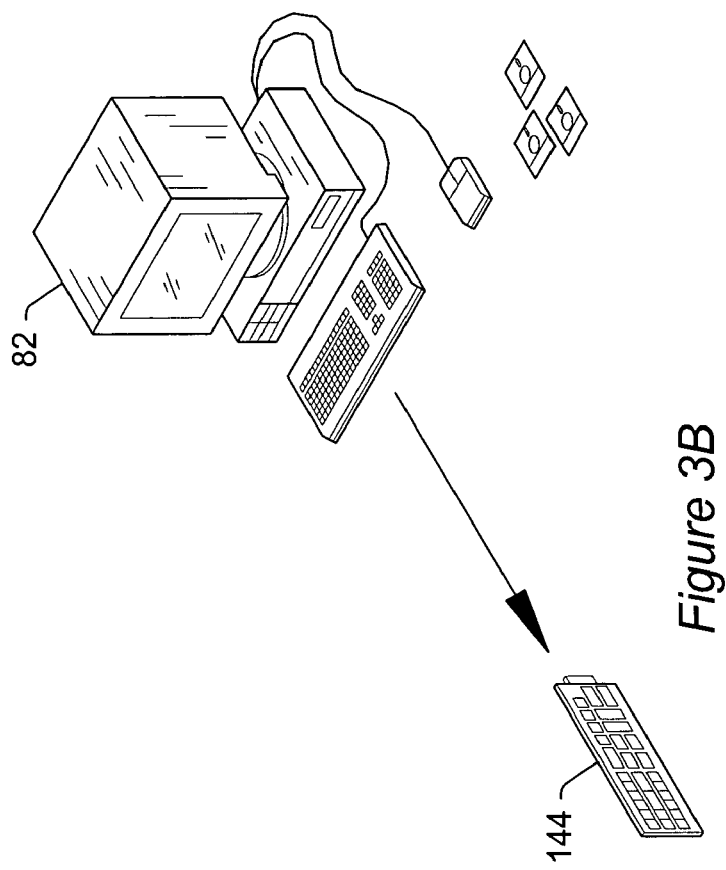
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
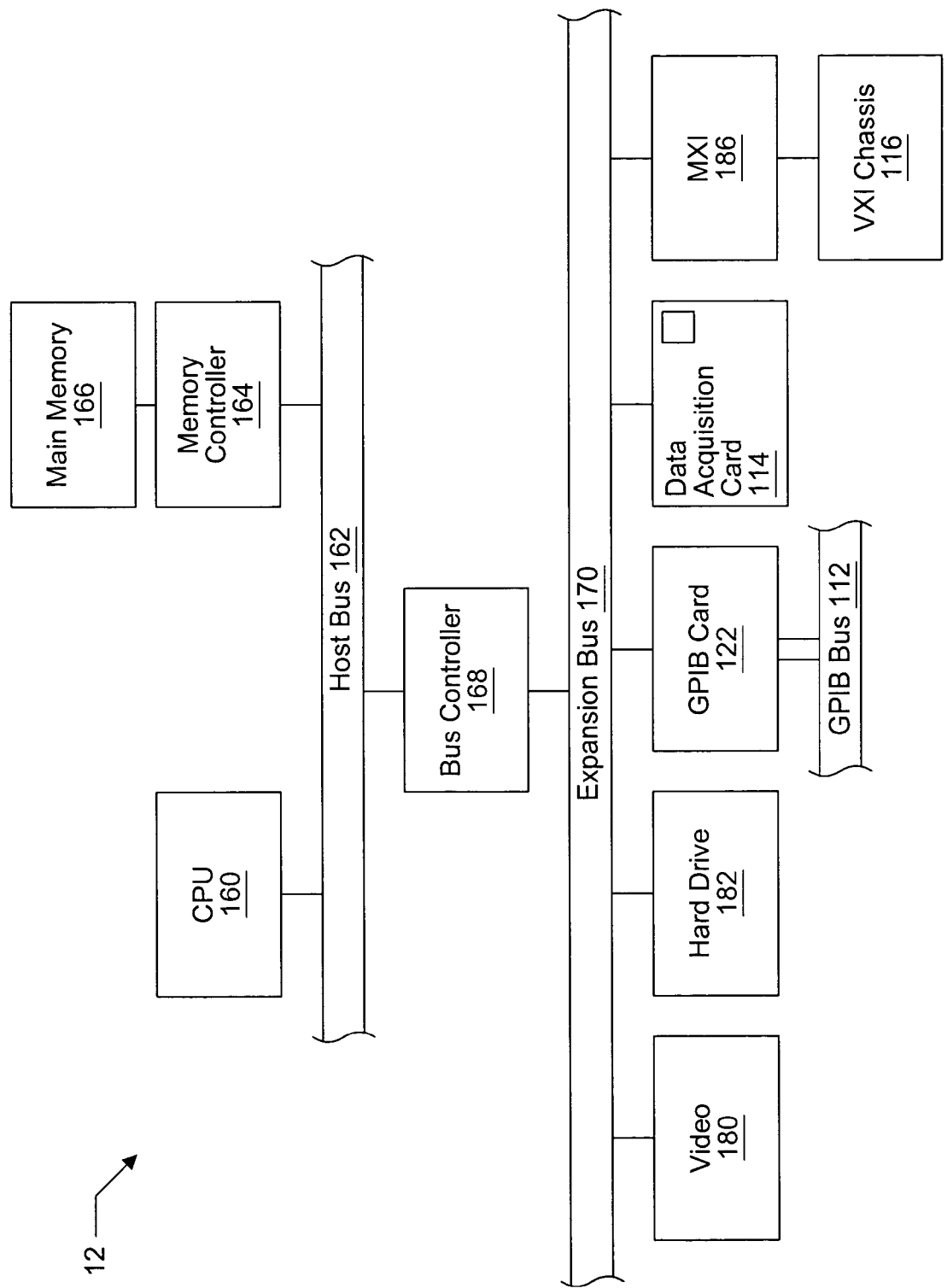
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the program instructions operable to facilitate provision of a GUI for accessing selected parameters of a graphical program, as well as a graphical program development environment for creating graphical programs. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a graphical program to the device 190 for execution of the graphical program on the device 190. The deployed graphical program may take the form of graphical program instructions or data structures that directly represent the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 5:
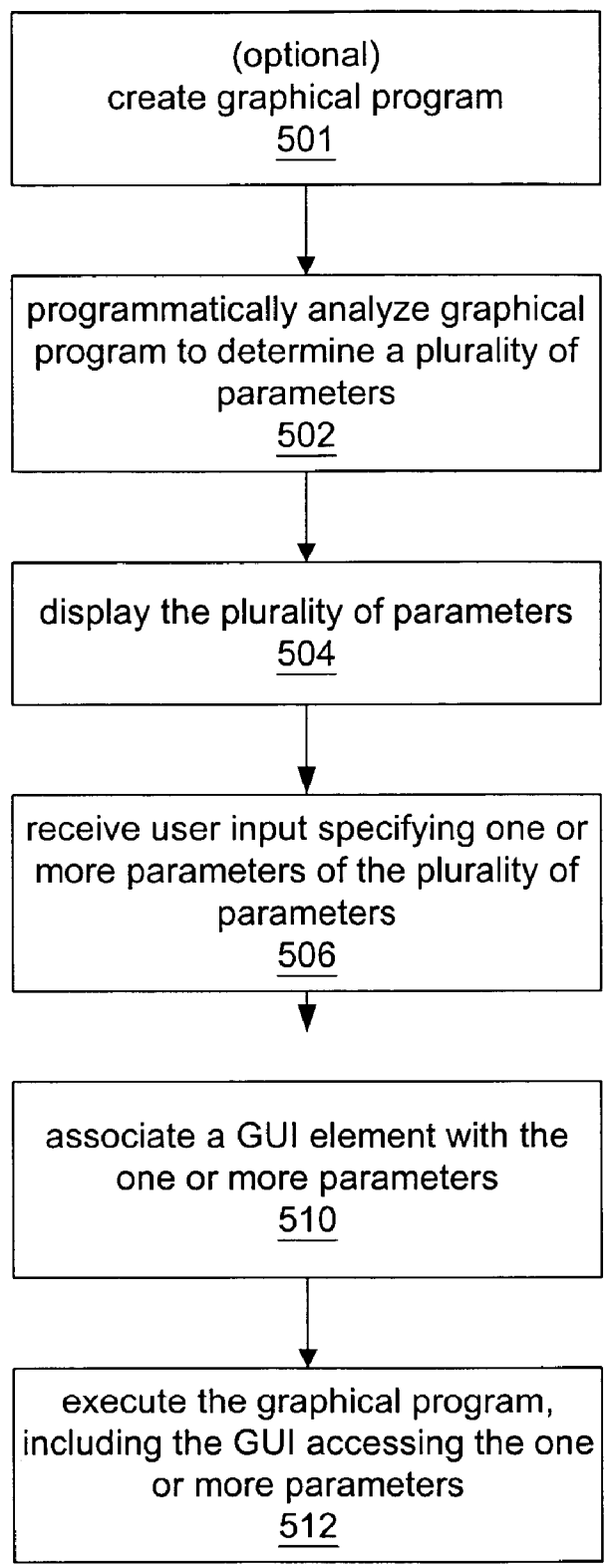
FIG. 5 is a high level flowchart diagram illustrating one embodiment of a method for providing a graphical user interface (GUI) for accessing selected parameters of a graphical program.

FIG. 5—Method for Providing a Graphical User Interface for Accessing Selected Parameters of a Graphical Program FIG. 5 is a flowchart diagram of one embodiment of a method for providing a graphical user interface or GUI for accessing selected parameters of a graphical program. Note that in various embodiments, some of the steps described may be performed concurrently, in a different order than shown, or omitted. Additional steps may also be performed as desired.

As FIG. 5 shows, in 501, a graphical program may optionally be created on the computer system 82 (or on a different computer system). The graphical program may be created or assembled by the user arranging on a display a plurality of nodes or icons and then interconnecting the nodes to create the graphical program. In response to the user assembling the graphical program, data structures and/or program instructions may be created and stored which represent the graphical program. The nodes may be interconnected in one or more of a data flow, control flow, or execution flow format. The graphical program may thus comprise a plurality of interconnected nodes or icons that visually indicates the functionality of the program. As noted above, the graphical program may comprise a block diagram and may also include a user interface portion or front panel portion. Where the graphical program includes a user interface portion, the user may assemble the user interface on the display. As one example, the user may use the LabVIEW graphical programming development environment to create the graphical program.

In an alternate embodiment, the graphical program may be created in step 501 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement any of a variety of functions, e.g., a measurement function, which the user desires to be performed, e.g., by an instrument. For example, in an application where the instrument is an image acquisition device (e.g., smart camera 190), the graphical program may implement an image processing function. In one embodiment, the graphical program may comprise a model, e.g., of a system of process.

In 502, the graphical program may be programmatically analyzed to determine a plurality of parameters referenced or used by the graphical program. For example, in one embodiment, each graphical program node in the graphical program may be analyzed to determine the parameters included in and/or used by the node. In another embodiment, source code for the graphical program may be analyzed to determine the parameters. In yet another embodiment, a symbol table or equivalent may be analyzed to determine the parameters.

Then, in 504, the plurality of parameters may be displayed, e.g., on a display device such as a computer monitor. In various embodiments, the plurality of parameters may be displayed in a number of ways. For example, in one embodiment, the plurality of parameters may be displayed in a list, e.g., in a menu, window, or dialog. In another embodiment, the plurality of parameters may be displayed in a tree diagram. For example, the plurality of parameters may be displayed in a hierarchy, where the hierarchy represents a structure and/or operation of the graphical program. In other words, various of the parameters may correspond to respective portions or functionalities of the graphical program, and may be presented in a manner that corresponds to or reflects a hierarchical relationship between these portions or functionalities.

In 506, user input selecting one or more parameters of the plurality of parameters may be received. For example, in one embodiment, the user input may include the user indicating the one or more parameters, e.g., by clicking on or otherwise selecting the parameters, with a pointing device, such as a computer mouse, although other means of selection are also contemplated. For example, in another embodiment, the user may enter names of the one or more parameters into a text entry field.

Figure 7:
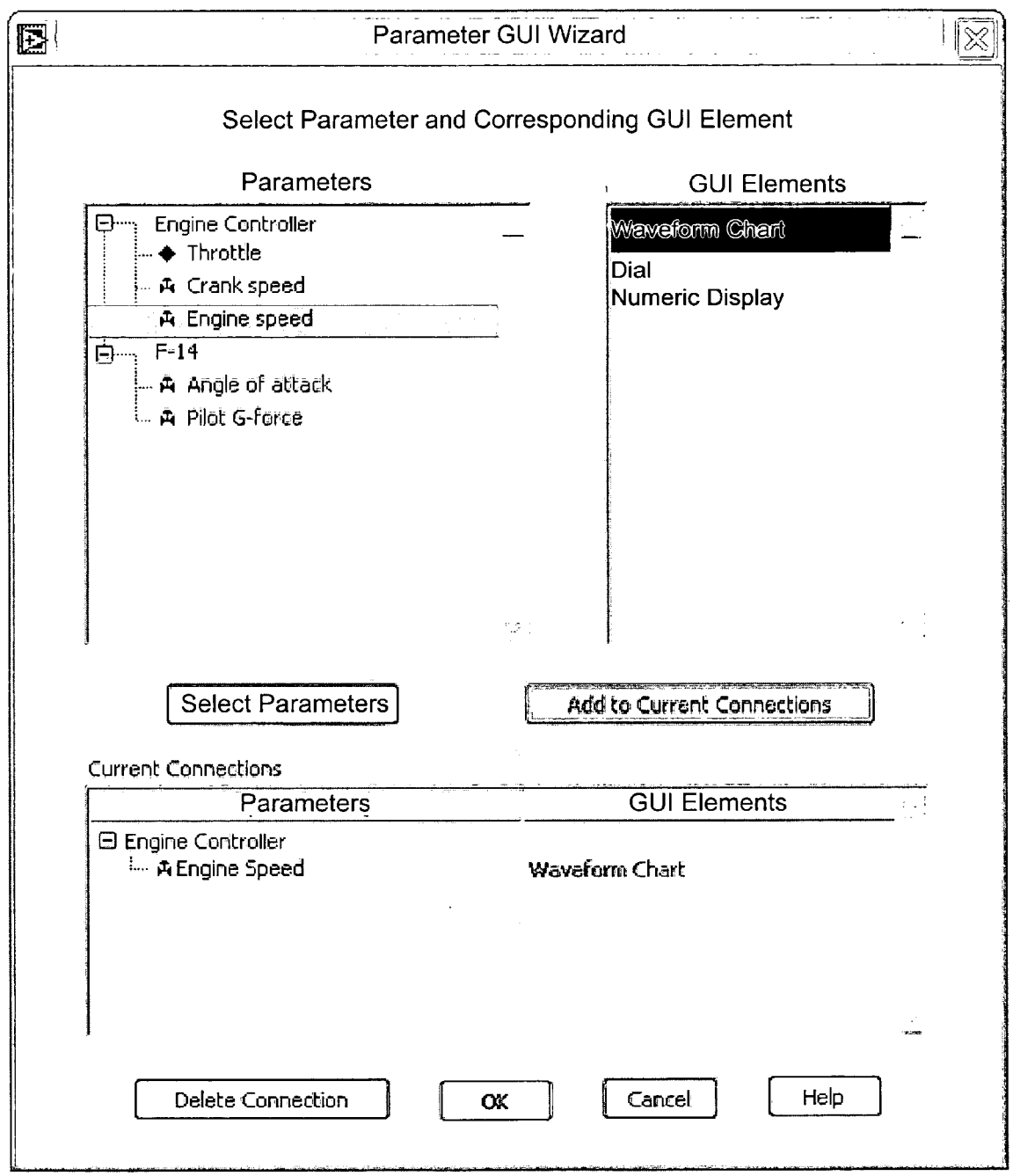
FIG. 7 illustrates a parameter GUI wizard, according to one embodiment.

In 510, a GUI element may be associated with the one or more parameters. For example, in one embodiment, the user may select a GUI element to associate with or link to a respective parameter. For example, the user may browse among various GUI elements, such as in a list or in palettes, and select an appropriate GUI element for a selected parameter. For example, as shown in FIG. 7, the user may select a parameter from a list of parameters on the left side of the display, and the user may then select a GUI element from a list of GUI elements that appear on the right side of the display. Other mechanisms may also be used for associating a GUI element With a parameter, such as drag and drop techniques, speech recognition, etc. Thus the user may select a first parameter, and then select a first GUI element to associate with the first parameter, and the user may then select a second parameter, and then select a second GUI element to associate with the second parameter, and so on. The user may thus operate to create a custom GUI comprising the selected GUI elements which are linked to the selected parameters. The user may assemble these selected GUI elements into a GUI, positioning them as desired, or the system may programmatically generate a GUI comprising the selected GUI elements.

In one embodiment, software may analyze the parameter selected by the user and programmatically determine a subset of GUI elements from which the user may select an appropriate GUI element to link to the selected parameter. The subset of GUI elements may be determined based on the type of parameter, such as the data type of the parameter, whether the parameter is desired to be read from or written to, and possibly other criteria. The user may then select a GUI element from this determined subset of GUI elements. Thus, the software may narrow the scope of the selections presented to the user based on the type and/or use of the parameter.

In another embodiment, in 510 a GUI for the one or more parameters may be programmatically created, where the GUI comprises one or more programmatically selected GUI elements corresponding respectively to the one or more parameters selected by the user. In one embodiment, creating the GUI for the one or more parameters may include analyzing the one or more parameters, including analyzing the data types of the one or more parameters, and programmatically determining the one or more GUI elements based on the analysis. For example, consider a case where the one or more parameters include data types of integer, double, and character data types. The method may analyze these data types and determine corresponding GUI elements appropriate for accessing parameters of these data types. Thus, integer numeric controls and/or indicators may be determined for parameters of integer data type, character controls and/or indicators may be determined for parameters of character data type, and so forth.

In one embodiment, at least one of the respective one or more GUI elements includes a control, where during execution of the graphical program the control is operable to receive input specifying a modification to the corresponding parameter, and modify the corresponding parameter in accordance with the input. In another embodiment, at least one of the respective one or more GUI elements includes an indicator, where during execution of the graphical program the indicator is operable to read the corresponding parameter, and display the corresponding parameter on a display device. In yet other embodiment, at least one of the respective one or more GUI elements may be both an indicator and a control, and so may be operable to both modify and display the corresponding parameter. In a further embodiment, one or more of the GUI elements may be operable to display and/or modify more than one parameter.

In one embodiment, generating or programmatically creating the GUI for the one or more parameters may further include receiving user input indicating whether each of the one or more parameters is to be read, written, or both, i.e., indicating an "access" type or mode for the parameter. In this embodiment, determining the one or more GUI elements based on the analysis may further include determining the one or more GUI elements based on the received user input indicating whether each of the one or more parameters is to be read, written, or both. For example, if the user indicates that a particular parameter is to be displayed (i.e., read) during execution of the graphical program, the determined GUI element for that parameter may be an indicator; if the user indicates that the parameter is to be modified (i.e., written) during execution of the graphical program, the determined GUI element may be a control; and if the user indicates that the parameter is to be displayed and modified (i.e., read and written) during execution of the graphical program, the determined GUI element may be both an indicator and a control.

Then, as indicated in 510, the GUI may be associated with the one or more parameters, e.g., either in response to user input, or programmatically. Said another way, the one or more GUI elements may be associated with the one or more parameters, where during execution of the graphical program, each of the one or more GUI elements may then be operable to access a corresponding parameter of the one or more parameters.

Finally, in 512, the graphical program may be executed, where executing the graphical program includes the one or more GUI elements accessing the one or more parameters. In other words, during execution of the graphical program, the various GUI elements may execute to read and display their respective parameters, write and modify the parameters, or both.

In one embodiment, determining the GUI for the one or more parameters includes determining a plurality of GUIs, where each of the plurality of GUIs includes a respective subset of the one or more GUI elements, and where each of the plurality of GUIs corresponds to a respective portion or operation of the graphical program. During execution of the graphical program, each GUI may operate to access parameters associated with the respective subset of the one or more GUI elements. In other words, the plurality of GUIs may be partitioned or organized such that each GUI corresponds to a respective portion or operation of the graphical program.

For example, in an embodiment where the graphical program is a model of a manufacturing process, there may be portions of the model corresponding to materials input, materials processing, quality testing, control, and so forth. Each of these portions of the model may have corresponding parameter sets, and each parameter set may have a corresponding GUI with respective GUI elements for each parameter in the set.

In one embodiment, during execution of the graphical program, each of the plurality of GUIs may be active during execution of the respective portion of the graphical program. For example, in the manufacturing process model example described above, as each portion of the model executes, the corresponding GUI may be activated, where constituent GUI elements of the GUI operate to access the corresponding parameters in that portion of the model. In one embodiment, when a portion of the graphical program is not executing, the corresponding GUI may be inactive or de-activated. In one embodiment, during execution of the graphical program, each of the plurality of GUIs may only be displayed during execution of the respective portion of the graphical program. In other embodiments, the active/inactive status of each GUI may be visually indicated by other means, e.g., by "graying" the GUI to indicate an "inactive state", sending the GUI to a background layer of the display, etc.

Further details of the GUI creation and association are described below with reference to FIGS. 6A and 6B.

Figure 6A:
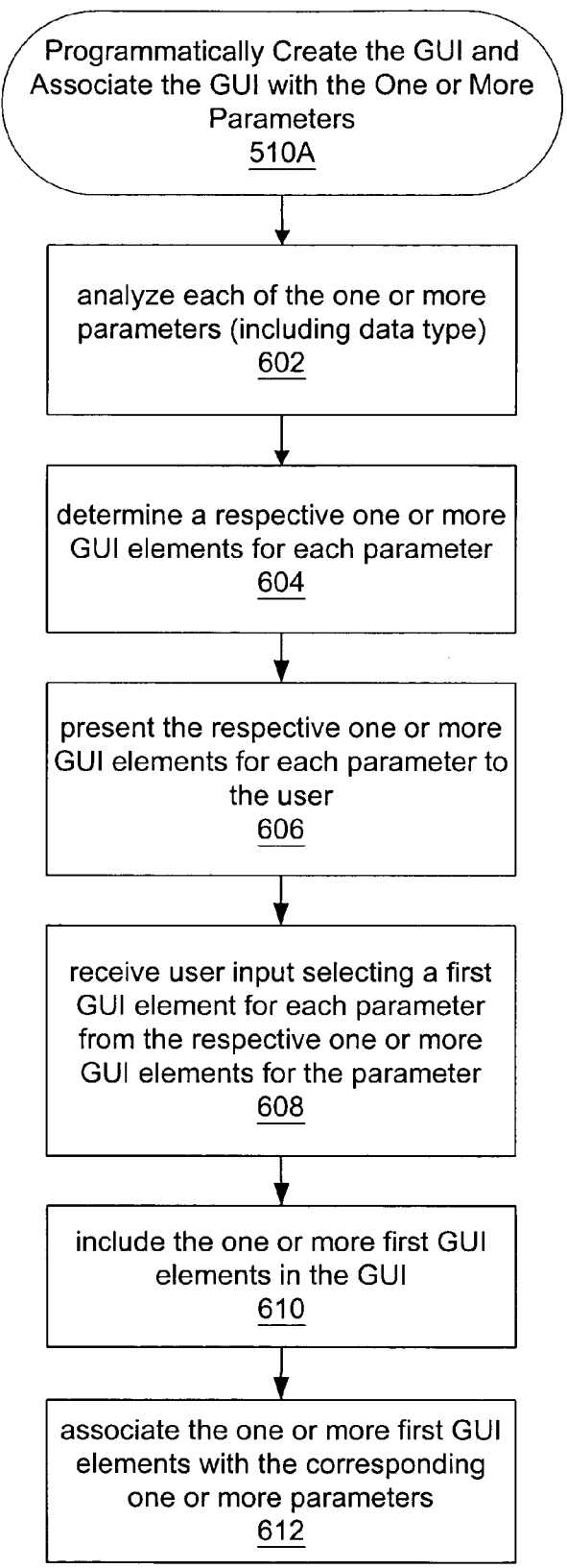
FIGS. 6A and 6B are flowchart diagrams illustrating embodiments of the method of FIG. 5.
Figure 6B:
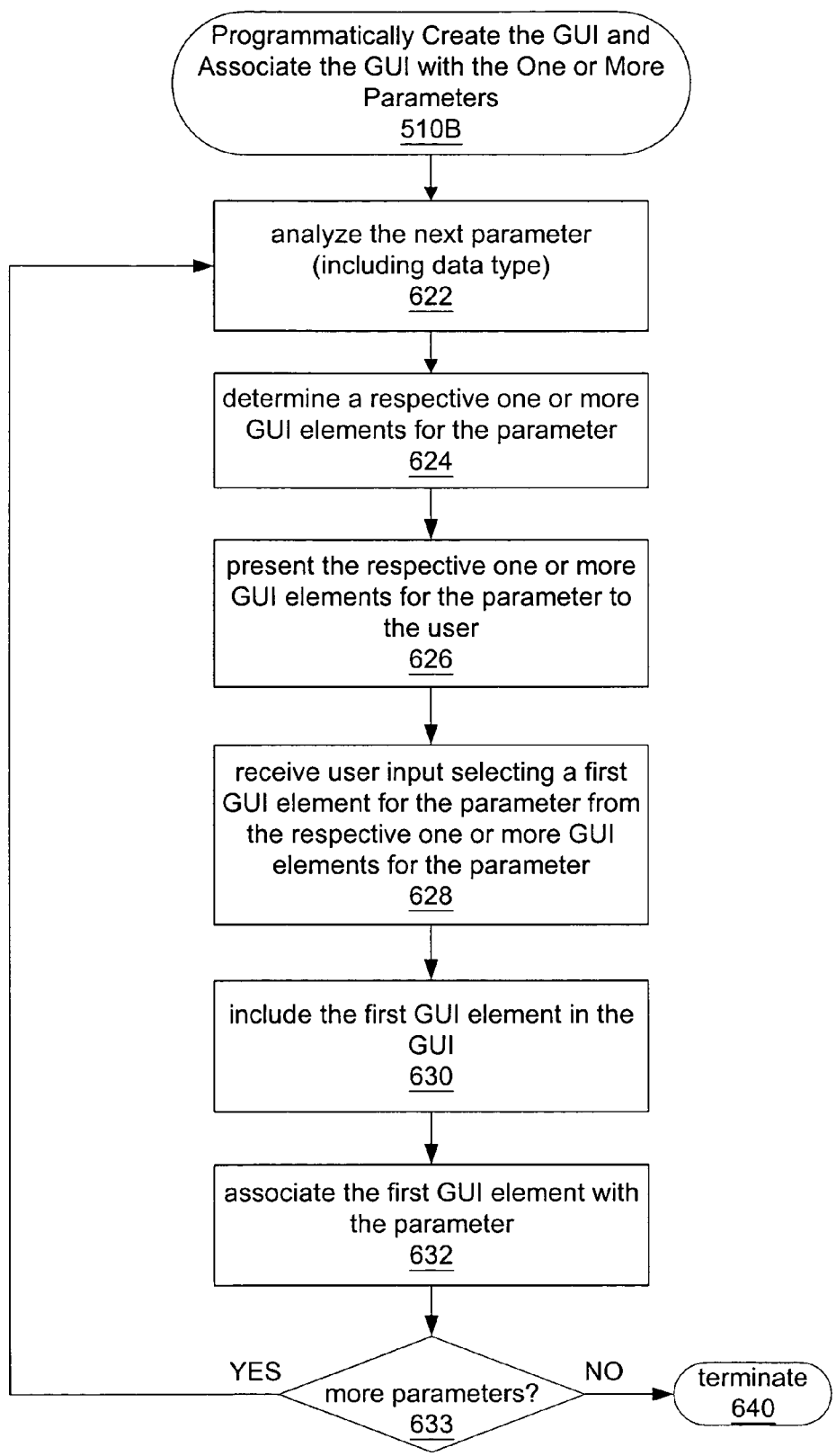

FIGS. 6A and 6B—GUI Creation and Association

FIGS. 6A and 6B flowchart two embodiments of step 510 of the method described above with reference to FIG. 5, wherein the GUI is generated (the GUI elements are programmatically selected and included in a GUI) for one or more parameters of a graphical program. In the following, descriptions of aspects of the methods that are substantially described above may be abbreviated. As noted above, in various embodiments, some of the steps described may be performed concurrently, in a different order than shown, or omitted. Additional steps may also be performed as desired.

As FIG. 6A shows, in 602, each parameter of the one or more parameters (selected by the user in 506 above) may be analyzed. In a preferred embodiment, the analysis includes analyzing the data type of each parameter, as described above.

Then, in 604, a respective one or more GUI elements for each parameter may be determined based on the analysis, where each of the respective one or more GUI elements for each parameter are operable to access parameters of the data type of the parameter.

In 606, the respective one or more GUI elements for each parameter may be presented to the user. As described above, the one or more GUI elements may be presented in a variety of ways, including, for example, via a list, menu, tree diagram, palette, a ring control or other means for cycling through items, and so forth. In a preferred embodiment, presenting the respective one or more GUI elements for each parameter to the user further includes indicating the parameter to the user. For example, an identifier, e.g., a label, for each parameter may be displayed proximate to the corresponding one or more GUI elements determined for that parameter, or a visual indicator may be used to indicate the correlation between the parameter and the one or more GUI elements, such as a line or lines, or other visual indicator. In one embodiment, presenting the respective one or more GUI elements for each parameter to the user may include displaying the respective one or more GUI elements for each parameter in a palette.

Alternatively, the one or more GUI elements for each parameter may be presented to the user in the form of GUI element identifiers, e.g., labels, such as in a list or menu corresponding to that parameter. In other words, presenting the respective one or more GUI elements for each parameter to the user may include displaying respective names or text descriptions of the respective one or more GUI elements for each parameter. Thus, in one embodiment, the corresponding parameter for the one or more GUI elements may be indicated with the presentation of the one or more GUI elements, e.g., by name, label, or description, as noted above.

In 608, user input may be received selecting a first GUI element for each parameter from the respective one or more GUI elements for the parameter, thereby selecting one or more first GUI elements corresponding to the one or more parameters. Thus, the one or more first GUI elements may comprise the one or more GUI elements mentioned in 508 above.

In response to the received user input of 608, the one or more first GUI elements may be included in the GUI, as indicated in 610. In other words, each of the selected first GUI elements may be organized or assembled into the GUI. For example, in one embodiment, the one or more GUI elements in the GUI may be included in a single window. In another embodiment, the one or more GUI elements in the GUI may be comprised in a plurality of windows, e.g., where each GUI element is displayed in a respective window, or where GUI elements are grouped and displayed in respective windows based on the relationships between the parameters or respective portions of the graphical program. In one embodiment where the GUI elements are included in a plurality of windows, the plurality of windows may be tiled, as is well known in the art. Other arrangements of GUI windows are also contemplated.

Finally, in 612, each of the one or more first GUI elements may be associated with a respective one of the one or more parameters, e.g., either programmatically, or in response to user input, where after being associated with the parameters, the GUI elements may be operable to display and/or modify the respective parameters during program execution.

Thus, in the embodiment of FIG. 6A, each step in the method may be performed for all of the selected parameters. In an alternative embodiment, described below with reference to FIG. 6B, the parameters may be processed in an iterative manner.

As FIG. 6B shows, in 622 a next parameter may be analyzed, including the data type of the parameter, as described above.

Then, in 624, a respective one or more GUI elements may be determined for the parameter based on the analysis of 622, where the respective one or more GUI elements are operable to access parameters of the data type of the parameter.

In 626, the respective one or more GUI elements for the parameter may then be presented to the user. In one embodiment, the one or more GUI elements may be presented to the user together, e.g., in a palette or list. In another embodiment, the one or more GUI elements may be presented to the user individually, e.g., using a ring control or other means for presenting items in a cyclic manner. As noted above, in one embodiment, presenting the respective one or more GUI elements to the user may further include presenting or indicating the parameter to the user. Similarly, as also noted above, presenting the respective one or more GUI elements to the user may include displaying respective names or text descriptions of the respective one or more GUI elements.

In 628, user input may be received selecting a first GUI element of the respective one or more GUI elements, and in 630, the first GUI element may be included in the GUI.

In 632, the first GUI element may be associated with the parameter, where after being associated with the parameter, the first GUI element may be operable to access the parameter during program execution.

As shown in FIG. 6B, in 633, a determination may be made as to whether there are additional parameters to process, and if not, the method may terminate, as indicated in 640. If there are further parameters to process, then the method may proceed with 622, analyzing the next parameter, and so forth, as described above.

Thus, the steps or operations described above may be repeated for each of the one or more parameters until a GUI element has been determined for and associated with each parameter. Thus, in the embodiment of FIG. 6B, the determining and associating may be performed in an iterative manner.

It should be noted that in other embodiments, various steps or portions of the approaches presented in FIGS. 6A and 6B may be combined. For example, in one embodiment, all of the one or more parameters may be analyzed, as described in 602 of FIG. 6A, and then steps 624 through 632 of FIG. 6B may be performed iteratively, i.e., for each of the one or more parameters.

As another example, in one embodiment, all of the one or more parameters may be analyzed and a respective one or more GUIs determined for each of the one or more parameters (602 and 604 of FIG. 6A). Then, steps 626 through 632 may be performed in an iterative manner, e.g., processing each parameter/GUI element one at a time, as described above with reference to FIG. 6B. Other combinations are also contemplated.

In yet another embodiment, the one or more parameters may be presented to the user, e.g., in a menu, list, tree diagram, ring control, etc., and for each iteration the user may select the (next) parameter to process from the one or more parameters. For example, in an embodiment that uses a ring control, the user may cycle through the one or more parameters until a desired parameter is selected, and the method may perform the analysis, determination of GUI elements, and so forth, as described above.

Subsequent to the generation or programmatic creation of the GUI, the user may wish to modify the GUI. Thus, in one embodiment, further user input may be received specifying a modification to the GUI, and the GUI modified in response to the further user input. For example, user input selecting an additional parameter of the plurality of parameters may be received, where modifying the GUI may include determining an additional GUI element corresponding to the additional parameter as described above, and associating the additional GUI element with the additional parameter, where during execution of the graphical program the additional GUI element may be operable to access the additional parameter.

In another embodiment, user input selecting a first parameter of the one or more parameters for disassociation from the GUI may be received, where the first parameter corresponds to a first GUI element of the one or more GUI elements. In this case, modifying the GUI may include disassociating the first GUI element from the additional parameter, and removing the first GUI element from the GUI.

In yet another embodiment, user input indicating a replacement GUI element for a first parameter of the one or more parameters may be received, where the first parameter is associated with a first GUI element. Modifying the GUI may then include disassociating the first GUI element from the first parameter and removing the first GUI element from the GUI, and including the replacement GUI in the GUI and associating the replacement GUI element with the first parameter, where during execution of the graphical program the replacement GUI element is operable to access the first parameter.

In a further embodiment, user input specifying a modification for a first GUI element of the one or more GUI elements may be received, where the first GUI element corresponds to a first parameter of the one or more parameters. Modifying the GUI may then include modifying the first GUI element in response to the user input specifying the modification, thereby generating a modified first GUI element, where during execution of the graphical program the modified first GUI element is operable to access the first parameter.

Note that in various embodiments, one or more of the adding, removing, modifying, generating, and replacing may be performed in response to user input, e.g., manually, or may be performed programmatically or automatically.

Once the GUI has been assembled, generated, programmatically created and/or modified as described above, the graphical program may be executed, where executing the graphical program includes the one or more GUI elements accessing the one or more parameters. For example, if a GUI element for a particular parameter is an indicator, then during program execution the indicator may display the value of the parameter, e.g., via a meter, gauge, numeric display, etc., in a front panel. If the GUI element for the parameter is a control, then during program execution the control may receive a new value for the parameter, e.g., from another program element, and may operate to modify the parameter accordingly. As is well known in the art, in some embodiments, the GUI element may be both an indicator and a control, and so the parameter may be displayed and modified during program execution.

FIG. 7—A Parameter GUI Wizard

In one embodiment, the creation of the GUI for the one or more parameters of the graphical program may be facilitated by a configuration tool, whereby the parameters and GUI elements may be displayed, and user input received, as described above. In one embodiment, the configuration tool may be integrated into the graphical program development environment. For example, the GUI creation functionalities described above may be invoked from a menu in the environment, or by clicking on a program icon. In another embodiment, the configuration tool may be invoked by the user, resulting in a GUI being displayed through which the user may interactively view and specify the parameters and GUI element associations.

FIG. 7 illustrates one embodiment of a parameter GUI wizard. It is noted that the GUI wizard shown is meant to be exemplary only, and is not intended to limit the appearance or functionality of the configuration tool to any particular appearance or functionality.

As FIG. 7 shows, in this embodiment, a window is displayed with various sections, e.g., controls, that show respective information, e.g., that display available or selected parameters and GUI elements, and current connections or associations, for a graphical program, e.g., in this case, a model. In other embodiments, rather than displaying a single window or panel, multiple windows or panels may be displayed, where each window or panel presents respective information, e.g., via a respective one or more controls, to the user. For example, in the control labeled "Parameters", parameters may be selected for establishing associations or connections with GUI elements, e.g., LabVIEW GUI elements. As noted above, in one embodiment, these parameters may be displayed in a tree control to reflect the hierarchy of the parameters or of corresponding portions of the graphical program that use the parameters, although any other presentation schemes and means may be used as desired. As indicated in this example, an engine speed parameter has been selected, thus, data related to engine speed may be accessed by a GUI element, e.g., for control and/or display of the engine speed.

Similarly, the control labeled "GUI Elements" provides a list of available GUI elements, e.g., LabVIEW GUI elements, which may comprise controls and/or indicators, as described above. Again, in various embodiments, these GUI elements may be displayed in different ways, e.g., in a tree control to show a hierarchy, a list, a palette, etc. The developer may thus select from the provided tree, list, palette, etc., and invoke establishment of an association or connection between the engine speed parameter and the selected GUI element, in this case, a waveform chart. In an embodiment where the waveform chart is an indicator, the waveform chart may display a plot of the engine speed, e.g., over time. Alternatively, in an embodiment where the waveform chart is a control, the waveform chart may, for example, indicate or represent an engine speed function or plot that determines the engine speed as a function of time. In other words, the waveform chart may send control data to the parameter such that the engine speed follows the profile or behavior of the waveform. In one embodiment, the waveform chart may provide means for the developer to modify or specify a desired waveform for the engine speed.

As shown below the two specification windows (the Parameters and GUI Elements windows or controls) described above, in the embodiment of FIG. 7, buttons are provided for selecting the one or more parameters from the plurality of parameters, and for adding the specified association or connection to the current list of associations or connections. For example, in one embodiment, the Parameters display may initially display all of the parameters for the graphical program. The user may select one or more of the parameters, e.g., by clicking on the desired parameters with a mouse, then click on the "Select Parameters" button, after which the Parameters display may only display the selected one or more parameters. In one embodiment, when the user selects one of the displayed parameters, the GUI Elements display may only display those GUI elements that are appropriate for the data type of the selected parameter, as described in detail above.

As FIG. 7 also shows, in this embodiment, a control is provided that displays current connections between parameters and LabVIEW GUI elements, such as that specified above and indicated in the window, accompanied by controls, e.g., buttons, allowing the developer or user to delete, confirm, and cancel specified connections, as well as request help.

In other embodiments, additional controls or menus may be provided for further functionality. For example, in one embodiment, selection of the "Select Parameters" button may invoke a menu that presents options for one or more of: restricting the parameters display to those parameters currently selected, resetting the parameters display to display all parameters of the graphical program, selecting parameters from a different graphical program, and so forth.

Thus, various embodiments of the systems and methods described above may be operable to provide a graphical user interface for selected parameters of a graphical program, where during program execution the graphical user interface may operate to access the selected parameters, e.g., for control and/or display.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-accessible memory medium that stores program instructions for providing a graphical user interface (GUI) having GUI elements for selected parameters of a data flow diagram wherein, the program instructions are executable by a processor to perform:
    displaying a data flow diagram on a display, wherein the data flow diagram comprises a plurality of interconnected nodes which visually indicate functionality of the data flow diagram, wherein the plurality of interconnected nodes comprise a plurality of nodes displayed on the display connected by lines displayed on the display, wherein the lines specify data flow among the plurality of nodes, wherein at least a subset of the plurality of nodes comprise user configurable parameters;
    displaying the user configurable parameters on the display, wherein the user configurable parameters are displayed separately from the data flow diagram;
    receiving user input selecting one or more of the user configurable parameters on the display;
    associating one or more GUI elements with the selected user configurable parameters in response to the user input; and
    automatically creating a GUI for the data flow diagram that includes the one or more GUI elements, wherein, during execution of the data flow diagram, each of the one or more GUI elements is operable to access a corresponding parameter of the one or more user configurable parameters to modify or display the parameter.

2. The memory medium of claim 1, wherein the program instructions are further executable to perform:
    analyzing the data flow diagram to determine the user configurable parameters.

3. The memory medium of claim 1, wherein the data flow diagram implements a model of a physical system.

4. The memory medium of claim 1, wherein said displaying the user configurable parameters comprises displaying the user configurable parameters in a list.

5. The memory medium of claim 1, wherein said displaying the user configurable parameters comprises displaying the user configurable parameters in a tree diagram.

6. The memory medium of claim 5, wherein said displaying the user configurable parameters in a tree diagram comprises:
displaying the user configurable parameters in a hierarchy, wherein the hierarchy represents a structure and/or operation of the data flow diagram.

7. The memory medium of claim 1, wherein said automatically creating the GUI comprises:
analyzing the one or more user configurable parameters, including analyzing the data types of the one or more user configurable parameters; and
determining the one or more GUI elements based on said analyzing.

8. The memory medium of claim 7, wherein at least one of the one or more GUI elements comprises:
a control, wherein during execution of the data flow diagram the control is operable to receive input specifying a modification to the corresponding parameter, and modify the corresponding parameter in accordance with the input.

9. The memory medium of claim 7, wherein at least one of the one or more GUI elements comprises:
an indicator, wherein during execution of the data flow diagram the indicator is operable to read the corresponding parameter, and display the corresponding parameter on a display device.

10. The memory medium of claim 7,
wherein said automatically creating the GUI further comprises:
receiving user input indicating whether each of the one or more user configurable parameters is to be read, written, or both; and
wherein said determining the one or more GUI elements based on said analyzing further comprises determining the one or more GUI elements based on the received user input indicating whether each of the one or more user configurable parameters is to be read, written, or both.

11. The memory medium of claim 1,
wherein said automatically creating the GUI comprises:
analyzing each parameter of the one or more user configurable parameters, including analyzing the data type of each parameter;
determining a respective one or more GUI elements for each parameter based on said analyzing, wherein each of the respective one or more GUI elements for each parameter are operable to access parameters of the data type of the parameter;
presenting the respective one or more GUI elements for each parameter to the user;
receiving user input selecting a first GUI element for each parameter from the respective one or more GUI elements for the parameter, thereby selecting one or more first GUI elements corresponding to the one or more user configurable parameters, wherein the one or more first GUI elements comprise the one or more GUI elements; and
including the one or more first GUI elements in the GUI; and
wherein said associating the one or more GUI elements with the one or more user configurable parameters comprises:
associating each of the one or more first GUI elements with a respective one of the one or more user configurable parameters.

12. The memory medium of claim 11, wherein said presenting the respective one or more GUI elements for each parameter to the user further comprises:
indicating the parameter to the user.

13. The memory medium of claim 11, wherein said presenting the respective one or more GUI elements for each parameter to the user comprises:
displaying the respective one or more GUI elements for each parameter in a palette.

14. The memory medium of claim 11, wherein said presenting the respective one or more GUI elements for each parameter to the user comprises:
displaying respective names or text descriptions of the respective one or more GUI elements for each parameter.

15. The memory medium of claim 1, wherein said associating is performed in an iterative manner, comprising:
for each parameter of the one or more user configurable parameters,
analyzing the parameter, including analyzing the data type of the parameter;
determining a respective one or more GUI elements for the parameter based on said analyzing, wherein the respective one or more GUI elements are operable to access parameters of the data type of the parameter;
presenting the respective one or more GUI elements to the user;
receiving user input selecting a first GUI element of the respective one or more GUI elements;
including the first GUI element in the GUI; and
associating the first GUI element with the parameter.

16. The memory medium of claim 15, wherein said presenting the respective one or more GUI elements to the user further comprises:
presenting the parameter to the user.

17. The memory medium of claim 15, wherein said presenting the respective one or more GUI elements to the user comprises:
displaying the respective one or more GUI elements in a palette.

18. The memory medium of claim 15, wherein said presenting the respective one or more GUI elements to the user comprises:
displaying respective names or text descriptions of the respective one or more GUI elements.

19. The memory medium of claim 1, wherein the program instructions are further executable to perform:
receiving further user input specifying a modification to the GUI; and
modifying the GUI in response to the further user input.

20. The memory medium of claim 19,
wherein said receiving further user input specifying a modification to the GUI comprises:
receiving user input selecting an additional parameter of the user configurable parameters;
wherein said modifying the GUI comprises:
determining an additional GUI element corresponding to the additional parameter;
including the additional GUI element in the GUI; and
associating the additional GUI element with the additional parameter; and
wherein, during execution of the data flow diagram, the additional GUI element is operable to access the additional parameter.

21. The memory medium of claim 19,
wherein said receiving further user input specifying a modification to the GUI comprises:

receiving user input selecting a first parameter of the one or more user configurable parameters for disassociation from the GUI, wherein the first parameter corresponds to a first GUI element of the one or more GUI elements;

wherein said modifying the GUI comprises:
disassociating the first GUI element from the additional parameter; and
removing the first GUI element from the GUI.

22. The memory medium of claim 19,
wherein said receiving further user input specifying a modification to the GUI comprises:
receiving user input indicating a replacement GUI element for a first parameter of the one or more user configurable parameters, wherein the first parameter is associated with a first GUI element;

wherein said modifying the GUI comprises:
removing the first GUI element from the GUI;
disassociating the first GUI element from the first parameter;
including the replacement GUI element in the GUI; and
associating the replacement GUI element with the first parameter;

wherein, during execution of the data flow diagram, the replacement GUI element is operable to access the first parameter.

23. The memory medium of claim 19,
wherein said receiving further user input specifying a modification to the GUI comprises:
receiving user input specifying a modification for a first GUI element of the one or more GUI element, wherein the first GUI element corresponds to a first parameter of the one or more user configurable parameters;

wherein said modifying the GUI comprises:
modifying the first GUI element in response to the user input specifying the modification, thereby generating a modified first GUI element; and wherein, during execution of the data flow diagram, the modified first GUI element is operable to access the first parameter.

24. The memory medium of claim 1, wherein the program instructions are further executable to perform:
determining a plurality of GUIs;
wherein each of the plurality of GUIs comprises a respective subset of the one or more GUI elements;
wherein each of the plurality of GUIs corresponds to a respective portion of the data flow diagram; and
wherein during execution of the data flow diagram, each GUI operates to access parameters associated with the respective subset of the one or more GUI elements.

25. The memory medium of claim 24, wherein, during execution of the data flow diagram, each of the plurality of GUIs is active during execution of the respective portion of the data flow diagram.

26. The memory medium of claim 25, wherein, during execution of the data flow diagram, each of the plurality of GUIs is only displayed during execution of the respective portion of the data flow diagram.

27. The memory medium of claim 1, wherein at least one of the one or more GUI elements comprises:
a control, wherein during execution of the data flow diagram the control is operable to receive input specifying a modification to the corresponding parameter, and modify the corresponding parameter in accordance with the input.

28. The memory medium of claim 1, wherein at least one of the one or more GUI elements comprises:

an indicator, wherein during execution of the data flow diagram the indicator is operable read the corresponding parameter, and display the corresponding parameter on a display device.

29. The memory medium of claim 1,
wherein the program instructions are further executable to perform:
receiving user input indicating whether each of the one or more user configurable parameters is to be read, written, or both; and
determining a plurality of GUI elements based on the user input indicating whether each of the one or more user configurable parameters is to be read, written, or both;
receiving user input selecting the one or more GUI elements from the plurality of GUI elements.

30. The memory medium of claim 1,
wherein the program instructions are further executable to perform:
analyzing each parameter of the one or more user configurable parameters, including analyzing the data type of each parameter;
determining a respective one or more GUI elements for each parameter based on said analyzing, wherein each of the respective one or more GUI elements for each parameter are operable to access parameters of the data type of the parameter;
presenting the respective one or more GUI elements for each parameter to the user;
receiving user input selecting a first GUI element for each parameter from the respective one or more GUI elements for the parameter, thereby selecting one or more first GUI elements corresponding to the one or more user configurable parameters, wherein the one or more first GUI elements comprise the one or more GUI elements; and
including the one or more first GUI elements in the GUI; and wherein said associating the one or more GUI elements with the one or more user configurable parameters comprises:
associating each of the one or more first GUI elements with a respective one of the one or more user configurable parameters.

31. The memory medium of claim 30, wherein said presenting the respective one or more GUI elements for each parameter to the user further comprises:
indicating the parameter to the user.

32. The memory medium of claim 30, wherein said presenting the respective one or more GUI elements for each parameter to the user comprises:
displaying the respective one or more GUI elements for each parameter in a palette.

33. The memory medium of claim 30, wherein said presenting the respective one or more GUI elements for each parameter to the user comprises:
displaying respective names or text descriptions of the respective one or more GUI elements for each parameter.

34. The memory medium of claim 1, wherein the program instructions are further executable to perform:
executing the data flow diagram, wherein said executing comprises:
the one or more GUI elements accessing the one or more user configurable parameters.

35. The memory medium of claim 1, wherein the program instructions are further executable to implement a configuration tool for said displaying the user configurable parameters, said receiving the user input, and for presenting the one or more GUI elements to the user.

36. The memory medium of claim 35,
wherein the configuration tool is further operable to perform:
displaying a plurality of GUI elements;
receiving user input selecting a parameter from the user configurable parameters; and
displaying the one or more GUI elements in response to the user input selecting the parameter, wherein the one or more GUI elements are each suitable for accessing the selected parameter during execution of the data flow diagram.

37. The memory medium of claim 36, wherein the configuration tool is further operable to perform:
receiving user input selecting a GUI element from the one or more GUI elements; and
associating the selected GUI element with the selected parameter; wherein the selected GUI element is operable to access the parameter during execution of the data flow diagram.

38. A method for programmatically creating a graphical user interface (GUI) having GUI elements for selected parameters of a data flow diagram, the method comprising:
displaying a data flow diagram on a display, wherein the data flow diagram comprises a plurality of interconnected nodes which visually indicate functionality of the data flow diagram, wherein the plurality of interconnected nodes comprise a plurality of nodes displayed on the display connected by lines displayed on the display, wherein the lines specify data flow among the plurality of nodes, wherein at least a subset of the plurality of nodes comprise user configurable parameters;
displaying the user configurable parameters on the display, wherein the user configurable parameters are displayed separately from the data flow diagram;
receiving user input selecting one or more of the user configurable parameters on the display;
associating one or more GUI elements with the selected user configurable parameters in response to the user input; and
automatically creating a GUI for the data flow diagram that includes the one or more GUI elements, wherein, during execution of the data flow diagram, each of the one or more GUI elements is operable to access a corresponding parameter of the one or more user configurable parameters to modify or display the parameter.

39. A system for configuring a user interface for a data flow diagram, wherein the user interface has at least one graphical user interface (GUI) element, the system comprising:
means for displaying a data flow diagram on a display, wherein the data flow diagram comprises a plurality of interconnected nodes which visually indicate functionality of the data flow diagram, wherein the plurality of interconnected nodes comprise a plurality of nodes displayed on the display connected by lines displayed on the display, wherein the lines specify data flow among the plurality of nodes, wherein at least a subset of the plurality of nodes comprise user configurable parameters;
means for displaying the user configurable parameters on the display, wherein the user configurable parameters are displayed separately from the data flow diagram;
means for receiving user input selecting one or more of the user configurable parameters on the display;
means for associating one or more GUI elements with the selected user configurable parameters in response to the user input; and
means for automatically creating a GUI for the data flow diagram that includes the one or more GUI elements, wherein, during execution of the data flow diagram, each of the one or more GUI elements is operable to access a corresponding parameter of the one or more user configurable parameters to modify or display the parameter.

40. A computer-accessible memory medium that stores program instructions for programmatically creating a graphical user interface (GUI) having GUI elements for selected parameters of a data flow diagram, wherein the program instructions are executable by a processor to perform:
displaying a data flow diagram on a display, wherein the data flow diagram comprises a plurality of interconnected nodes which visually indicate functionality of the data flow diagram, wherein the plurality of interconnected nodes comprise a plurality of nodes displayed on the display connected by lines displayed on the display, wherein the lines specify data flow among the plurality of nodes, wherein at least a subset of the plurality of nodes comprise user configurable parameters;
programmatically analyzing the data flow diagram to determine the user configurable parameters;
displaying the user configurable parameters on the display, wherein the user configurable parameters are displayed separately from the data flow diagram;
receiving user input selecting a first parameter of the user configurable parameters;
receiving user input selecting a first GUI element for the first parameter, wherein the user input associates the first GUI element with the first parameter; and
automatically creating a GUI for the data flow diagram that includes the first GUI element, wherein, during execution of the data flow diagram, the first GUI element is operable to access the first parameter to modify or display the first parameter.

41. A method for providing a graphical user interface (GUI) having GUI elements for selected parameters of a data flow diagram, the method comprising:
displaying a data flow diagram on a display, wherein the data flow diagram comprises a plurality of interconnected nodes which visually indicate functionality of the data flow diagram, wherein the plurality of interconnected nodes comprise a plurality of nodes displayed on the display connected by lines displayed on the display, wherein the lines specify data flow among the plurality of nodes, wherein at least a subset of the plurality of nodes comprise user configurable parameters;
programmatically analyzing the data flow diagram to determine the user configurable parameters;
displaying the user configurable parameters on the display, wherein the user configurable parameters are displayed separately from the data flow diagram;
receiving user input selecting a first parameter of the user configurable parameters;
receiving user input selecting a first GUI element for the first parameter, wherein the user input associates the first GUI element with the first parameter; and
automatically creating a GUI for the data flow diagram that includes the first GUI element, wherein, during execution of the data flow diagram, the first GUI element is operable to access the first parameter to modify or display the first parameter.

* * * * *